Patented July 31, 1923.

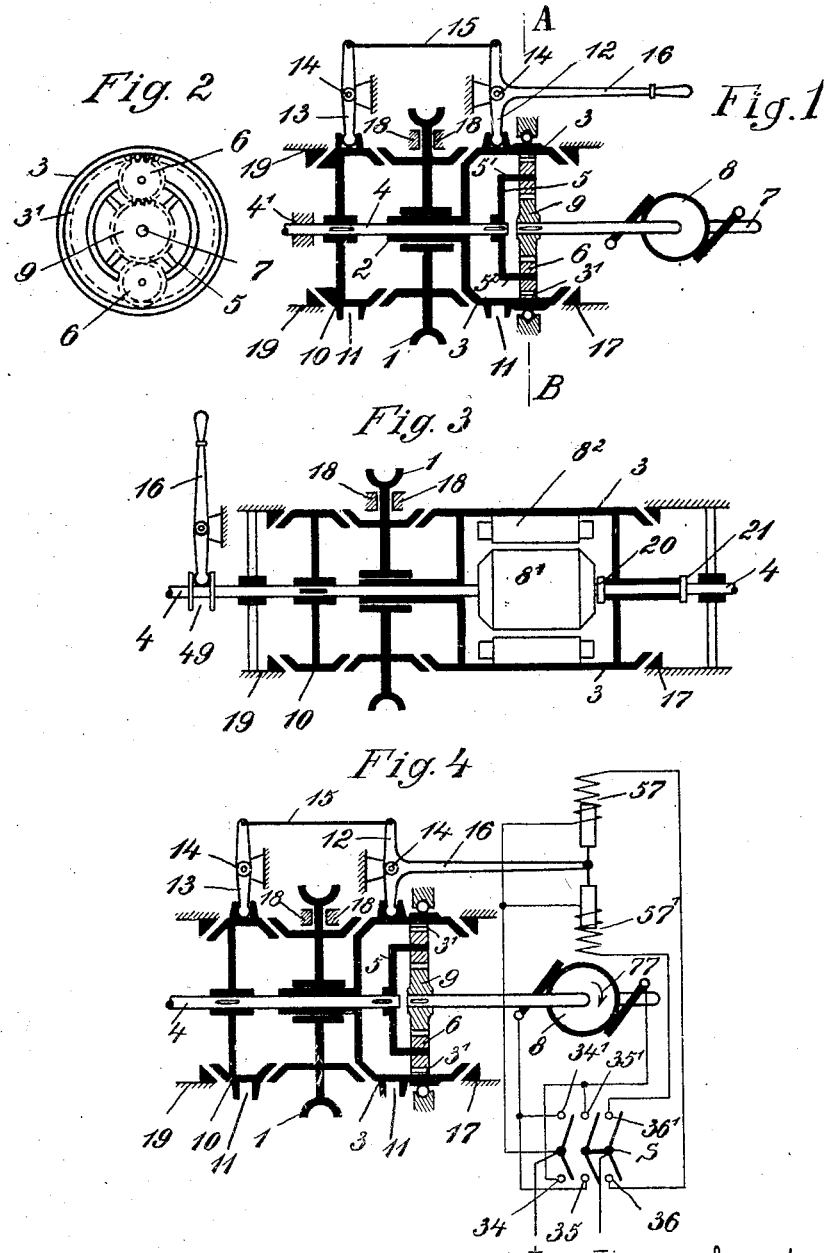

1,463,638

UNITED STATES PATENT OFFICE.

LUDWIG THALLMAYER, OF BERLIN-CHARLOTTENBURG, GERMANY, ASSIGNOR TO SIEMENS-SCHUCKERTWERKE GESELLSCHAFT MIT BESCHRÄNKTER HAFTUNG, OF SIEMENSSTADT, NEAR BERLIN, GERMANY, A CORPORATION OF GERMANY.

REVERSING GEAR.

Application filed July 14, 1922. Serial No. 575,002.

*To all whom it may concern:*

Be it known that I, LUDWIG THALLMAYER, a citizen of the Austrian Empire, residing at Berlin-Charlottenburg, Germany, have invented certain new and useful Improvements in Reversing Gears (for which I have filed applications in Germany, May 7, 1921; England, June 10, 1922), of which the following is a specification.

My invention refers to a reversing gear for connecting a motor with machinery for power transmission purposes. According to the arrangement provided the motor may alternately run in opposite directions as may be desired while the driven machinery may continue running in the same direction or else the motor may continuously run in the same direction and the machinery be caused to run in either direction.

In the first mentioned case, auxiliary power operated means may be provided by which the reversing gear is automatically put into action as soon as the direction of rotation of the driving motor is altered.

The accompanying drawings represent various appropriate constructional forms of the subject matter of the present invention:

Fig. 1 is a sectional elevation of an arrangement with a motor having a unidirectioned rotation.

Fig. 2 is a cross-section on the line A—B of Fig. 1;

Fig. 3 is a sectional elevation of an arrangement, in which the reversing action and movement is obtained by means of an electric machine, of which the inducing and the induced parts are so disposed that they can both rotate; and Fig. 4 is a sectional elevation showing an arrangement similar to that shown in Fig. 1, in which, however, a power operated control of the gear shift lever, instead of hand control is provided.

Referring to Fig. 1:—By means of a planet-gearing a division of the motor movement takes place into a right-hand rotary movement of a machine part and into a rotary tendency of the left-hand rotation of a second supported machine part. By the employment of the planet-gearing, an arrangement of the driving end and of the driven parts of the planet-gearing in axial alinement and a high transmission ratio, for instance for the right-hand rotation, are attained.

By locking the planet-wheel axles or the rim, driven by the planet-wheels, the motor movement is transmitted to the unlocked one of the two machine parts above-mentioned.

1 designates a pulley which is to be rotated by the motor alternately in one or the other direction. Said pulley is revolubly mounted on the sleeve-like boss 2 of the clutch member 3. The latter is revolubly mounted on a shaft 4 supported in fixed bearings $4^1$. Said shaft 4 carries a collar 5 which has two studs $5^1$ parallel to said shaft and on which the planet-wheels 6 are revolubly arranged. Said wheels are in gear with an internal toothing $3^1$ provided on the clutch member 3 and with a gear wheel 9 keyed to the shaft 7 of the motor 8. The shaft 4 carries a clutch member 10 which turns with the same and which may be immovably mounted thereon. Each of the two clutch members 3 and 10 has a circumferential groove 11, and in each of said grooves engages a lever 12 and 13 respectively. Both said levers, which are fulcrumed each on a fixed point 14, are connected by means of a coupling-rod 15. The lever 12 is provided with a hand-lever 16, which can be locked in its mean position and in both end positions (not shown). The motor 8 runs, when driving the pulley 1, continuously in one and the same direction. By turning the hand-lever, for instance, upwards, the clutch member 3 comes in engagement with the fixed clutch rim 17 and is accordingly stopped. The two planet-wheels 6 move then bodily in the same direction of rotation as the motor 8 and toothed wheel 9 connected therewith; the angular speed of the arms $5^1$ carrying the two planet-wheels 6 is then, however, lower than that of the wheel 9 owing to said planet-wheels rolling off on the internal toothing $3^1$ of the clutch member 3 locked at 17.

Simultaneously with the engagement of the clutch member 3 with the fixed rim 17, the engagement of the clutch member 10 with the corresponding clutch rim of the pulley 1 takes place; the latter is loosely mounted on the boss 2 of the clutch member 3 and said boss is axially movable in the hub of the pulley 1. The latter is prevented from shifting axially by means of fixed rollers 18 arranged on both sides of the same. The pulley 1, when coupled, runs with the clutch member 10 at the speed of the shaft 4.

Upon the hand-lever 16 being then turned beyond its mean position in downward direction, the clutch member 3 comes in engagement with pulley 1 while the clutch member 10 is released from the pulley 1 and abuts against the fixed clutch rim 19. Then collar 5 is locked and the clutch member 3 and pulley 1 are rotated in opposite direction to the toothed wheel 9 fixed on the motor shaft and which maintains its unaltered rotary direction.

From Fig. 2 follows per se that the ratio of gearing between the wheels 9 and $3^1$ can be differently chosen at will.

With the above arrangement, it is supposed that the motor 8 is driving and the pulley 1 driven. In some cases, it may happen that the transmission of energy takes place the reverse way, that is the pulley 1 is driving and the machine 8 driven, so that it acts as a current generator.

In the arrangement shown in Fig. 3, when at work, the inducing part of the electric machine is at rest while the induced part is driven, or vice versa. In the example, the armature $8^1$ of a dynamo electric machine is keyed on the shaft 4 and the inducing part $8^2$ is arranged within the clutch member 3 and fixed thereto. The control-lever 16 engages in a ring groove 49 of the shaft 4; the latter being coupled for axial displacement with the clutch member 3 by means of two collars 20, 21. The clutch member 3 can freely turn on the shaft 4. When the latter is shifted to the left, the clutch member 3 comes into engagement with the axially immovable pulley 1 and the clutch member 10 with the fixed clutch rim 19. Clutch member 10, shaft 4 and armature $8^1$ are then prevented from rotating while the inducing part $8^2$ rotates with the clutch member 3 and the pulley 1 coupled therewith in a certain given direction. When shaft 4 is shifted to the right, clutch member 10 and with it armature $8^1$ becomes coupled with pulley 1 and the clutch member 3 with the inducing part becomes locked and the pulley 1 will then run in opposite direction.

Fig. 4 shows a constructional form of the gearing in Fig. 1, in which the lever 16 is mechanically turned to one or to the other side by motive power, preferably through the same power which operates the principal motor. The reversal of the lever takes place in dependence upon the position of the member determining the rotary direction of the principal motor. As soon as the latter changes its rotary direction, the relative positions between the brake elements, for instance 17, 19 and clutches 10, 3 are automatically reversed in such a way that the pulley 1 continues rotating in the original rotary direction.

When the switch-levers $s$, which are shown in Fig. 4 in the switched-off position, are thrown so that their lower arms engage the contacts 34, 35, 36, the principal motor 8 rotates in a determined direction and the electromagnet 57 is excited. Consequently, lever 16 is raised and thereby the clutch member 3 is brought into engagement with the fixed clutch rim 17 while at the same time the clutch member 10 is coupled with the pulley 1. When the switch-levers $s$ are thrown onto the fixed contacts 34', 35', 36', the motor runs in opposite direction and the electromagnet $57^1$ is excited; clutch member 10 is then brought into engagement with fixed rim 19 and clutch member 3 is coupled with the pulley 1, whereby the pulley 1 is thus caused to continue running in the original direction in spite of the motor 8 being reversed. In this example, the two electromagnets form the auxiliary motor for reversing the lever 16 to one or the other side.

What I claim, is:—

1. In a reversing gear, a source of motive power, a rotatably supported shaft, a disk, rotatable thereon, but immovable in axial direction and suitable to transmit mechanical energy to machinery to be driven, said disk having a clutch member fixed to each of its sides, a first clutch drum located at one side of said disk and fixed to said shaft, said drum having a clutch face on the side facing said disk and having at its other side a braking face, a fixed braking member adapted to engage said braking face when said drum is axially shifted in one direction said drum engaging said disk when being shifted in the other direction, a second clutch drum disposed at the other side of said disk and revolvable on said shaft, said second drum having a clutch face on the side facing said disk and on its other side a braking face, a fixed brake member adapted to engage said last-named braking face of the second drum when the drum is axially shifted in one direction, said drum being adapted to engage said disk when axially shifted in the other direction, means adapted to axially shift said two clutch drums simultaneously in one or the other direction to alternately bring one or the other drum into engagement with said disk and said braking members respectively, and means for alternately connecting the power source to one or the other clutch drum, when the drum so connected is axially shifted to engage said disk.

2. In a reversing gear, a source of motive power, a rotatably supported shaft, a disk rotatable thereon, but immovable in axial direction and suitable to transmit mechanical energy to machinery to be driven, said disk having a clutch member fixed to each of its sides, a first clutch drum located at one side of said disk and fixed to said shaft, said drum having a clutch face on the side facing said disk and having at its other side a braking face, a fixed braking member adapted to engage said braking face when said drum is axially shifted in one direction, said drum engaging said disk when being shifted in the other direction, a second clutch drum located at the other side of said disk and revolvable on said shaft, said second drum having a clutch face on the side facing said disk and on its other side a braking face, a fixed brake member adapted to engage said last-named braking face of the second drum when the drum is axially shifted in one direction, said drum adapted to engage said disk when axially shifted in the other direction, means adapted to axially shift said two clutch drums simultaneously in one or the other direction to alternately bring one or the other drum into engagement with said disk and said braking members respectively, said second clutch drum having suitable power transmitting gearing connected to it and to said shaft for alternately connecting the motive power to one of either drums, when the drum so connected is axially shifted to engage said disk.

3. In a reversing gear, a motor and means for controlling it to run in both directions of rotation, a rotatably supported shaft, a disk, rotatable thereon, but immovable in axial direction and suitable to transmit mechanical energy to machinery to be driven, said disk having a clutch member fixed to each of its sides, a first clutch drum located at one side of said disk and fixed to said shaft, said drum having a clutch face on the side facing said disk and having at its other side a braking face, a fixed braking member adapted to engage said braking face when said drum is axially shifted in one direction, said drum engaging said disk when being shifted in the other direction, a second clutch drum rotated at the other side of said disk and revolvable on said shaft, said second drum having a clutch face on the side facing said disk and on its other side a braking face, a fixed brake member adapted to engage said last-named braking face of the second drum when the drum is axially shifted in one direction, said drum being adapted to engage said disk when axially shifted in the other direction, means adapted to axially shift said two clutch drums simultaneously in one or the other direction to alternately bring one or the other drum into engagement with said disk and said braking members respectively, and means for alternately connecting the motor to one or the other clutch drum, when the drum so connected is axially shifted to engage said disk, and means suitably connected to said motor control means and to said shifting means for operating the latter in one or the other direction according to the rotation direction of the motor determined by said control means.

4. In a reversing gear, a source of motive power, a rotatably supported shaft, a disk, rotatable thereon, but immovable in axial direction and suitable to transmit mechanical energy to machinery to be driven, said disk having a clutch member fixed to each of its sides, a first clutch drum located at one side of said disk and fixed to said shaft, said drum having a clutch face on the side facing said disk and having at its other side a braking face, a fixed braking member adapted to engage said braking face when said drum is axially shifted in one direction, said drum engaging said disk when being shifted in the other direction, a second clutch drum rotated at the other side of said disk and revolvable on said shaft, said second drum having a clutch face on the side facing said disk and on its other side a braking face, a fixed brake member adapted to engage said last-named braking face of the second drum when the drum is axially shifted in one direction, said drum being adapted to engage said disk when axially shifted in the other direction, means adapted to axially shift said two clutch drums simultaneously in one or the other direction to alternately bring one or the other drum into engagement with said disk and said braking members respectively, said second clutch drum containing a planetary gear in its interior, whose orbit gear is fixed to said drum, whose planetary wheels are fixed to said shaft and whose central gear is connected with said motive power, said planetary gear permitting the connection of the motive power to one of either drums when the drum so connected is axially shifted to engage said disk.

5. In a reversing gear, a motor, and means for controlling it to run in both directions of rotation, a rotatably supported shaft, a disk, rotatable thereon, but immovable in axial direction and suitable to transmit mechanical energy to machinery to be driven, said disk having a clutch member fixed to each of its sides, a first clutch drum located at one side of said disk and fixed to said shaft, said drum having a clutch face on the side facing said disk and having at its other side a braking face, a fixed braking member adapted to engage said braking face when said drum is axially shifted in one direction, said drum engaging said disk when being shifted in the other direction, a second clutch drum rotated at the other side of said disk and revolvable on said shaft, said second drum having a clutch face on the side facing said disk and on its other side a braking face, a fixed brake member adapted to engage said last-named braking face of the second drum when the drum is axially shifted in one direction, said drum being adapted to engage said disk when axially shifted in the other direction, means adapted to axially shift said two clutch drums simultaneously in one or the other direction to alternately bring one or the other drums into engagement with said disk and said braking members respectively, said second clutch drum containing a planetary gear in its interior whose orbit gear is fixed to said drum, whose planetary wheels are fixed to said shaft and whose central gear is fixed to said motive power, said planetary gear permitting the connection of the motor to one of either drums when the drum so connected is axially shifted to engage said disk, and means suitably connected to said motor control means and to said shifting means for operating the latter in one or the other direction according to the rotation direction of the motor determined by said control means.

In testimony whereof I affix my signature.

LUDWIG THALLMAYER.